(12) United States Patent
Kurokawa et al.

(10) Patent No.: US 11,222,529 B2
(45) Date of Patent: Jan. 11, 2022

(54) TRAVELING ASSISTING METHOD AND TRAVELING ASSISTING SYSTEM FOR EMERGENCY VEHICLE

(71) Applicant: TOYOTA JIDOSHA KABUSHIKI KAISHA, Toyota (JP)

(72) Inventors: Naoki Kurokawa, Tokyo-to (JP); Takenori Shimizu, Inuyama (JP); Junya Watanabe, Shizuoka-ken (JP); Jun Goto, Toyota (JP); Koji Kawasaki, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 16/161,789

(22) Filed: Oct. 16, 2018

(65) Prior Publication Data

US 2019/0122542 A1 Apr. 25, 2019

(30) Foreign Application Priority Data

Oct. 20, 2017 (JP) .................................. 2017-203714

(51) Int. Cl.
*G08G 1/01* (2006.01)
*G08G 1/0965* (2006.01)
(Continued)

(52) U.S. Cl.
CPC ......... *G08G 1/0125* (2013.01); *G08G 1/0145* (2013.01); *G08G 1/0965* (2013.01);
(Continued)

(58) Field of Classification Search
CPC .... G08G 1/0125; G08G 1/087; G08G 1/0145; G08G 1/0965; G08G 1/096716;
(Continued)

(56) References Cited

U.S. PATENT DOCUMENTS 6,958,707 B1 * 10/2005 Siegel .................... G08G 1/087
340/435
9,934,685 B1 * 4/2018 Bernhardt ............ G08G 1/0965
(Continued)

FOREIGN PATENT DOCUMENTS

JP 2001184596 A * 7/2001
JP 2012-128587 A 7/2012
(Continued)

*Primary Examiner* — Behrang Badii
*Assistant Examiner* — Daniel L Greene
(74) *Attorney, Agent, or Firm* — Hunton Andrews Kurth LLP

(57) ABSTRACT

A traveling assisting method for an ambulance vehicle includes the first to third steps. The first step is the step of causing a server to acquire an expected arrival time at which an ambulance vehicle arrives at a traffic intersection that is located on an expected traveling route of the ambulance vehicle. The second step is the step of causing the server to acquire an expected arrival time at which a vehicle arrives at the traffic intersection, when the vehicle is located in surroundings of the expected traveling route. The third step
(Continued)

is the step of causing the server to transmit a restraint instruction to the vehicle to travel toward the traffic intersection and to restrain entry of a vehicle other than the ambulance vehicle into the traffic intersection.

6 Claims, 7 Drawing Sheets

(51) Int. Cl.
  *G08G 1/0967* (2006.01)
  *G05D 1/02* (2020.01)
  *G08G 1/09* (2006.01)
  *G08G 1/00* (2006.01)
  *G08G 1/015* (2006.01)

(52) U.S. Cl.
  CPC . *G08G 1/096716* (2013.01); *G08G 1/096725* (2013.01); *G05D 1/0297* (2013.01); *G08G 1/015* (2013.01); *G08G 1/091* (2013.01); *G08G 1/22* (2013.01)

(58) Field of Classification Search
  CPC .. G08G 1/096725; G08G 1/015; G08G 1/091; G08G 1/22; G05D 1/0297
  See application file for complete search history.

(56) References Cited

U.S. PATENT DOCUMENTS

| | | | |
|---|---|---|---|
| 10,156,848 B1* | 12/2018 | Konrardy | G01C 21/34 |
| 2004/0128062 A1* | 7/2004 | Ogino | G01C 21/3697 701/400 |
| 2007/0008174 A1* | 1/2007 | Schwartz | G08G 1/087 340/902 |
| 2007/0035416 A1* | 2/2007 | Tanaka | B60T 7/18 340/906 |
| 2011/0084853 A1* | 4/2011 | Johnson | G08G 1/087 340/906 |
| 2011/0193722 A1* | 8/2011 | Johnson | G08G 1/087 340/906 |
| 2012/0191476 A1* | 7/2012 | Reid | G06Q 10/10 705/3 |
| 2018/0132193 A1* | 5/2018 | Misener | H04W 4/46 |
| 2018/0208185 A1* | 7/2018 | Rao | G08G 1/161 |

FOREIGN PATENT DOCUMENTS

| | | |
|---|---|---|
| JP | 2012-230523 A | 11/2012 |
| JP | 2014-211693 A | 11/2014 |
| JP | 2015-172791 A | 10/2015 |

* cited by examiner

TRAVELING ASSISTING METHOD AND TRAVELING ASSISTING SYSTEM FOR EMERGENCY VEHICLE

This nonprovisional application is based on Japanese Patent Application No. 2017-203714 filed on Oct. 20, 2017 with the Japan Patent Office, the entire contents of which are hereby incorporated by reference.

BACKGROUND

Field

The present disclosure relates to a traveling assisting method for an emergency vehicle and a traveling assisting system for an emergency vehicle, and also to a technique for assisting traveling of an emergency vehicle in an emergency.

Description of the Background Art

The technique for utilizing one vehicle for assisting another vehicle has been proposed. For example, Japanese Patent Laying-Open No. 2012-230523 discloses a rescue service of using a rescue vehicle for rescuing a vehicle-to-be-rescued having a battery with insufficient energy and making a request for rescue. According to this rescue service, a vehicle-to-be-rescued and a rescue vehicle meet each other at a merge point. Then, the rescue vehicle supplies energy to the vehicle-to-be-rescued while the rescue vehicle and the vehicle-to-be-rescued are together traveling toward the destination of the vehicle-to-be-rescued (for example, see Abstract in Japanese Patent Laying-Open No. 2012-230523).

SUMMARY

Japanese Patent Laying-Open No. 2012-230523 discloses that the rescue vehicle traveling toward the merge point with the vehicle-to-be-rescued may travel by automated driving (for example, see paragraph [0057] in Japanese Patent Laying-Open No. 2012-230523). In this way, it is conceivable that the vehicle capable of automated driving (which will be hereinafter also referred to as an "automated driving vehicle") may be used for assisting other vehicles. However, in Japanese Patent Laying-Open No. 2012-230523, it is not taken into consideration that such an automated driving vehicle is utilized for assisting traveling of an emergency vehicle in an emergency (which will be hereinafter also referred to as "emergency traveling").

The present disclosure has been made to solve the above-described problems. An object of the present disclosure is to provide a technique for assisting emergency traveling of an emergency vehicle using an automated driving vehicle according to a traveling assisting method for an emergency vehicle and a traveling assisting system for an emergency vehicle.

A traveling vehicle that is currently traveling around is used in a traveling assisting method for an emergency vehicle according to an aspect of the present disclosure. The traveling vehicle is configured to communicate with a server through a network, to travel by automated driving, and to travel around by unmanned driving. The traveling assisting method for an emergency vehicle includes the first to third steps. The first step is the step of causing the server to acquire an expected arrival time at which the emergency vehicle arrives at an obstruction site that is located on an expected traveling route of the emergency vehicle and where emergency traveling of the emergency vehicle is to be obstructed. The second step is the step of causing the server to acquire an expected arrival time at which the traveling vehicle arrives at the obstruction site, when location information received from the traveling vehicle shows that the traveling vehicle is located in surroundings of the expected traveling route. The third step is the step of causing the server to transmit an instruction to the traveling vehicle to travel toward the obstruction site and to restrain a vehicle other than the emergency vehicle from entering the obstruction site, when the expected arrival time of the traveling vehicle is earlier than the expected arrival time of the emergency vehicle.

The obstruction site is a traffic intersection.

According to the method described in the above, before an emergency vehicle such as an ambulance vehicle arrives at an obstruction site (for example, a traffic intersection), a traveling vehicle that is currently traveling around by automated driving in the vicinity of the expected traveling route of the emergency vehicle is instructed to travel toward the obstruction site and to prevent other vehicles from entering the obstruction site (for example, to place the traveling vehicle to serve as a barricade, as shown in the FIG. 4). In this way, the traveling vehicle is utilized to ensure a traveling route of the emergency vehicle, thereby allowing smooth emergency traveling of the emergency vehicle. In other words, emergency traveling of the emergency vehicle can be assisted.

The transmitting an instruction (the third step) further includes causing the server to transmit another instruction to the traveling vehicle to restrain entry, into the traffic intersection, of a vehicle excluding the emergency vehicle and traveling through the traffic intersection in a direction intersecting with a traveling direction of the emergency vehicle, when the expected arrival time of the traveling vehicle is earlier than the expected arrival time of the emergency vehicle, and when a traveling direction of the traveling vehicle at the traffic intersection is opposite to the traveling direction of the emergency vehicle.

According to the method described in the above, the vehicle traveling in the direction intersecting with the traveling direction of the emergency vehicle can be prevented from entering the traffic intersection. Accordingly, smoother emergency traveling of the emergency vehicle can be achieved.

The traveling assisting method for an emergency vehicle further includes causing the traveling vehicle that arrives at the obstruction site to notify a vehicle other than the emergency vehicle that the emergency vehicle is going to travel through the obstruction site.

According to the method described in the above, other vehicles (drivers of other vehicles) having received the notification are allowed to recognize the situation that an emergency vehicle is going to travel through the traffic intersection, thereby obtaining cooperation from these other vehicles, so that smoother emergency traveling of the emergency vehicle can be achieved.

The traveling assisting method for an emergency vehicle further includes causing the server to select a traveling vehicle from among a plurality of traveling vehicles as candidates by using location information about each of the plurality of traveling vehicles, and to instruct the selected traveling vehicle to travel as the emergency vehicle.

According to the method described in the above, an appropriate traveling vehicle can be selected using the location information about each of the plurality of traveling vehicles and can be caused to travel as an emergency vehicle.

A traveling assisting system for an emergency vehicle according to another aspect of the present disclosure includes a server and a traveling vehicle. The server includes a map information database storing information about an obstruction site that is located on an expected traveling route of the emergency vehicle and where emergency traveling of the emergency vehicle is to be obstructed. The traveling vehicle is configured to communicate with the server through a network, to travel by automated driving and to travel around by unmanned driving. The server is configured to acquire an expected arrival time at which the emergency vehicle arrives at the obstruction site, acquire an expected arrival time at which the traveling vehicle arrives at the obstruction site, when location information received from the traveling vehicle shows that the traveling vehicle is located in surroundings of the expected traveling route, and transmit an instruction to the traveling vehicle to travel toward the obstruction site and to restrain a vehicle other than the emergency vehicle from entering the obstruction site, when the expected arrival time of the traveling vehicle is earlier than the expected arrival time of the emergency vehicle.

According to the configuration described in the above, as in the method described in the above, the traveling vehicle that is currently traveling around by automated driving in the vicinity of the expected traveling route of the emergency vehicle is utilized, to thereby restrain (prevent) other vehicles from entering the obstruction site. Thereby, smooth emergency traveling of the emergency vehicle can be achieved, so that emergency traveling of the emergency vehicle can be assisted.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
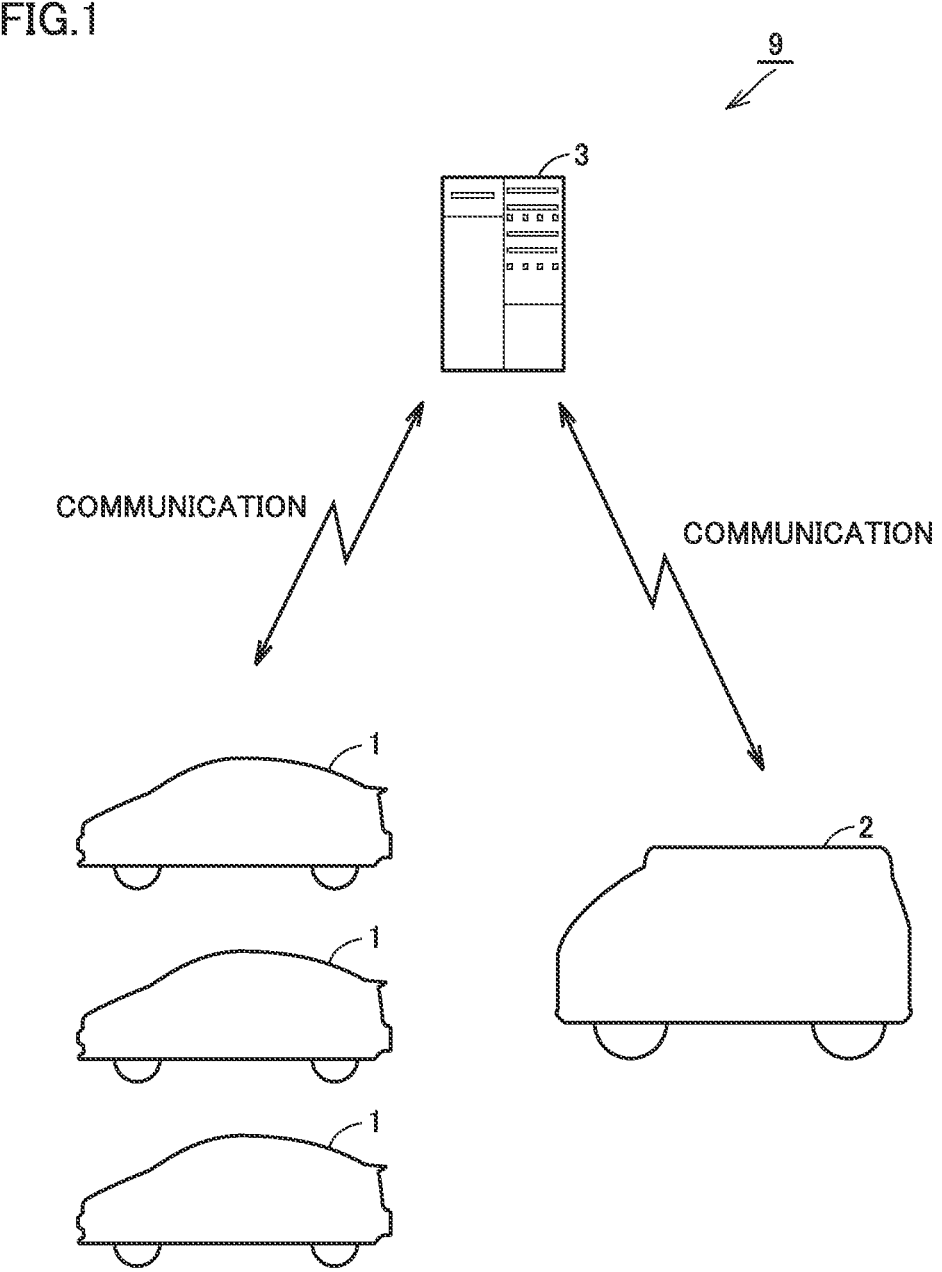
FIG. 1 is a diagram schematically showing the entire configuration of a traveling assisting system for an emergency vehicle according to the present embodiment.

Embodiments of the present disclosure will be hereinafter described in detail with reference to the accompanying drawings. In the accompanying drawings, the same or corresponding components are designated by the same reference characters, and the description thereof will not be repeated.

In the following description, an explanation will be given with regard to an example of the configuration in which an "emergency vehicle" according to the present disclosure is an ambulance vehicle. However, the "emergency vehicle" according to the present disclosure is not limited to an ambulance vehicle but may be a vehicle that executes emergency traveling for lifesaving, disaster response and the like. Examples of such a vehicle may be a fire vehicle, a police vehicle, a transport vehicle, an accident handling vehicle, a chemical protection vehicle, and the like.

Embodiments

<Configuration of Traveling Assisting System for Emergency Vehicle>

FIG. 1 is a diagram schematically showing the entire configuration of a traveling assisting system for an ambulance vehicle according to the present embodiment. Referring to FIG. 1, a traveling assisting system 9 includes a plurality of vehicles 1, an ambulance vehicle 2, and a communication instruction center 3.

Each of the plurality of vehicles 1 is a vehicle capable of automated driving (automated driving vehicle), which is an electric vehicle, for example. Each vehicle 1 may be other vehicles (a hybrid vehicle, a fuel-cell vehicle, and the so-called conventional vehicle).

In the present embodiment, it is assumed that a user (a driver) does not sit in vehicle 1 and vehicle 1 is currently traveling around by unmanned driving (that is, vehicle 1 is currently traveling around by automated driving). For example, when vehicle 1 is a private vehicle of a user, there may be a case where, after the user is delivered to the user's destination and then gets out of vehicle 1, vehicle 1 may travel around by automated driving for going back to a prescribed position (the house of the user, and the like). Also, when vehicle 1 is a service vehicle (a taxi and the like), there may be a case where, after one user gets out of vehicle 1, vehicle 1 may for example travel around by automated driving for going back to a vehicle dispatch station or may travel around by automated driving until the next user gets on vehicle 1. In the following description, for the sake of simplification of the drawings, every vehicle 1 is described as a vehicle of the same type, but the vehicle type of each vehicle 1 is not particularly limited and may be different from each other.

Ambulance vehicle 2 serves as a vehicle for immediately and safely transporting a person in need of help (a sick or wounded person) to a medical facility such as a hospital, and executes emergency traveling in an emergency.

Communication instruction center 3 is configured to be capable of bidirectional communication with ambulance vehicle 2 and serves to assist emergency traveling of ambulance vehicle 2. Also, communication instruction center 3 is configured to be capable of bidirectional communication with a plurality of vehicles 1. Communication instruction center 3 serves as an instruction base, for example, for managing the traveling conditions of ambulance vehicle 2 and assisting guiding to a person in need of help or assisting transportation of a person in need of help to a medical facility. For example, when a plurality of vehicles 1 serve as service vehicles, communication instruction center 3 may serves as a base for managing dispatch of each vehicle 1 (that is, a vehicle dispatch center).

Figure 2:
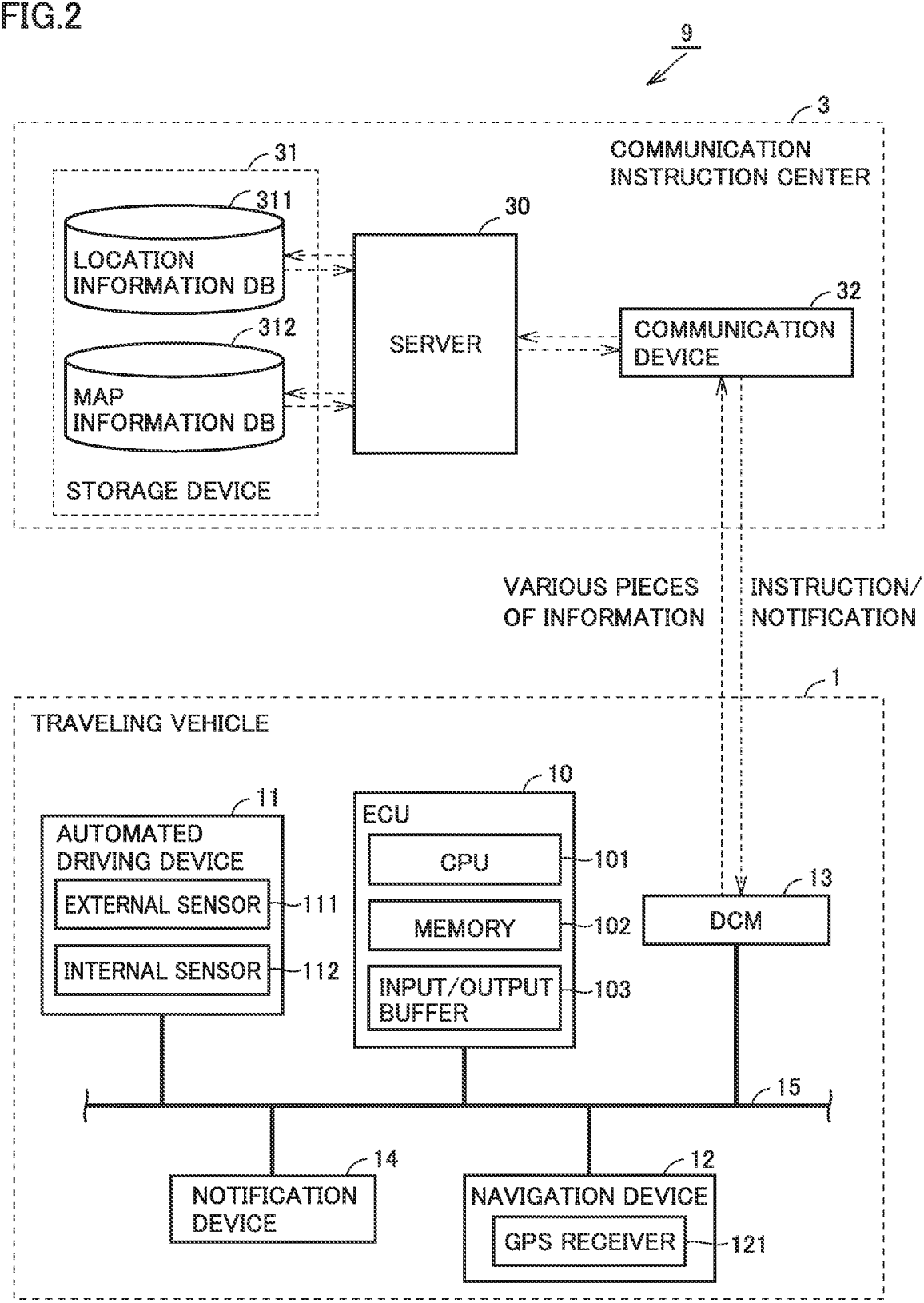
FIG. 2 is a diagram showing the configuration of the traveling assisting system for an emergency vehicle in greater detail.

FIG. 2 is a diagram showing the configuration of traveling assisting system 9 for ambulance vehicle 2 in greater detail. Each of the plurality of vehicles 1 basically has a common basic configuration. Thus, FIG. 2 shows only one vehicle 1 and the configuration thereof will be representatively described below.

Vehicle 1 includes an electronic control unit (ECU) 10, an automated driving device 11, a navigation device 12, a communication module 13, and a notification device 14. ECU 10, automated driving device 11, navigation device 12, communication module 13, and notification device 14 are connected to each other through a vehicle-mounted wired network 15 such as a controller area network (CAN).

Automated driving device 11 is configured to allow vehicle 1 to travel by automated driving. The term "automated driving" refers to control in which driving operations of vehicle 1 such as acceleration, deceleration, and steering are performed without driving operations of vehicle 1 by a driver. Automated driving includes lane keeping assist control and navigation control, for example. In lane keeping assist control, a handle (not shown) is automatically steered such that vehicle 1 travels along a traveling lane without deviating from the traveling lane. In navigation control, for example, when there is no preceding vehicle in front of vehicle 1, constant speed control for controlling vehicle 1 to travel at a prescribed constant speed is performed. Also, when there is a preceding vehicle in front of vehicle 1, tracking control for adjusting the vehicle speed of vehicle 1 in accordance with the distance between vehicle 1 and its preceding vehicle is performed.

More specifically, automated driving device 11 is configured to perform full-automated driving. Thus, for automated driving by automated driving device 11, a driver does not need to stay in the vehicle or operate the vehicle under all the situations. Accordingly, vehicle 1 is capable of traveling around by automated driving. Automated driving by automated driving device 11 may be provided as a function carried out by ECU 10. Automated driving device 11 includes: an external sensor 111 configured to detect a situation outside vehicle 1; and an internal sensor 112 configured to detect information corresponding to a traveling state of vehicle 1 and detect a steering operation, an accelerating operation, and a braking operation.

External sensor 111 includes, for example, a camera, a radar, a LIDAR (Laser Imaging Detection and Ranging) (each of which is not shown). The camera captures an image of a situation outside vehicle 1 and outputs, to ECU 10, the captured-image information regarding the situation outside vehicle 1. The radar transmits electric wave (for example, millimeter wave) to surroundings of vehicle 1 and receives electric wave reflected by an obstacle to detect the obstacle. Then, the radar outputs, to ECU 10, the distance to the obstacle and the direction of the obstacle as obstacle information regarding the obstacle. The LIDAR transmits light (typically, ultraviolet rays, visible rays, or near infrared rays) to the surroundings of vehicle 1 and receives light reflected by an obstacle to measure the distance to the reflecting point and detect the obstacle. The LIDAR outputs, to ECU 10, the distance to the obstacle and the direction of the obstacle as obstacle information, for example.

Internal sensor 112 includes, for example, a vehicle speed sensor, an acceleration sensor, a yaw rate sensor (each of which is not shown). The vehicle speed sensor is provided at a wheel of vehicle 1 or a drive shaft that is rotated together with the wheel, detects the rotating speed of the wheel, and outputs the vehicle speed information including the speed of vehicle 1 to ECU 10. The acceleration sensor includes: a forward/backward acceleration sensor configured to detect the acceleration in the forward/backward direction of vehicle 1; and a lateral acceleration sensor configured to detect the lateral acceleration of vehicle 1, for example. The acceleration sensor outputs acceleration information including both the accelerations to ECU 10. The yaw rate sensor detects a yaw rate (rotation angle speed) around the vertical axis of the center of gravity of vehicle 1. The yaw rate sensor is, for example, a gyro sensor, and outputs yaw rate information including the yaw rate of vehicle 1 to ECU 10.

Navigation device 12 includes a global positioning system (GPS) receiver 121 configured to specify the location of vehicle 1 based on electric waves from satellites (not shown). Navigation device 12 performs various types of navigation processes of vehicle 1 using the location information (GPS information) of vehicle 1 specified by GPS receiver 121. More specifically, navigation device 12 calculates a traveling route (expected traveling route or target route) from the current location of vehicle 1 to the destination based on the GPS information of vehicle 1 and the road map data stored in the memory (not shown), and outputs the information about the target route to ECU 10. It should be noted that, during manned driving of vehicle 1, navigation device 12 notifies the driver about the target route by way of presentation on a display and audio output from a speaker (both of which are not shown).

Communication module 13 is an in-vehicle DCM (Data Communication Module), and is configured to perform bidirectional data communication with ECU 10 and with server 30 in communication instruction center 3.

Notification device 14 is used for notifying the surroundings of vehicle 1 about traveling of ambulance vehicle 2 according to a control signal from ECU 10 (which will be described later in detail). Although not shown, notification device 14 may be a hazard lamp or a speaker that is configured to provide an audio output to the outside the vehicle, for example. Furthermore, notification device 14 may be a display capable of displaying a message to the outside of the vehicle (a guide display unit and the like) or may be a warning light (a red light and the like).

ECU 10 is configured to include a central processing unit (CPU) 101, a memory 102, and an input/output buffer 103. In response to a signal from each sensor and the like, ECU 10 controls devices to bring vehicle 1 into a desired state. For example, ECU 10 controls automated driving device 11 and a driving device (not shown) of a motor generator, thereby performing various controls for implementing automated driving (including traveling around by automated driving) of vehicle 1 (the above-described lane keeping assist control, navigation control, and the like). Furthermore, ECU 10 transmits various pieces of information (location information about vehicle 1, and the like) to server 30 through communication module 13, or receives an instruction or a notification from server 30, thereby performing "traveling assisting control" for assisting traveling of the emergency vehicle such as ambulance vehicle 2. This traveling assisting control will be described later.

Communication instruction center 3 includes, for example, server 30 serving as an application server, a storage device 31, and a communication device 32. Storage device 31 includes a location information database 311 and a map information database 312, each of which serves as a database server.

Location information database 311 stores location information collected from a plurality of vehicles 1. Location information database 311 may store the location information about ambulance vehicle 2. Map information database 312 stores the road map data. The road map data is used for calculating the traveling route of ambulance vehicle 2.

Communication device 32 is configured to be capable of bidirectional data communication with communication module 13 mounted in vehicle 1.

Server 30 collects location information about a plurality of vehicles 1 and ambulance vehicle 2 through communication device 32, and causes location information database 311 to store the collected location information. Then, server 30 performs traveling assisting control by using the location information stored in location information database 311 and the road map data stored in map information database 312.

Although not shown, ambulance vehicle 2 also has the basic configuration in common with vehicle 1. However, unlike vehicle 1, ambulance vehicle 2 may not be configured to be capable of automated driving (and traveling around by automated driving). In other words, ambulance vehicle 2 may not include automated driving device 11 and may be capable only of manned driving.

<Emergency Traveling of Ambulance Vehicle>

When ambulance vehicle 2 travels toward a person in need of help, or when ambulance vehicle 2 transports a person in need of help to a medical facility, immediate and safe emergency traveling of ambulance vehicle 2 is desirable. For example, when ambulance vehicle 2 passes through a traffic intersection while executing emergency traveling, (a driver of) ambulance vehicle 2 is required to check its surrounding situation to see whether (drivers of) other vehicles recognize the existence of ambulance vehicle 2 and stop appropriately. However, there may be a case where another vehicle enters a traffic intersection to hinder the emergency traveling of ambulance vehicle 2. As a result, it takes time for ambulance vehicle 2 to pass through the traffic intersection, so that arrival of ambulance vehicle 2 at the destination may be delayed.

Thus, in the present embodiment, before ambulance vehicle 2 passes through a traffic intersection, at least one vehicle 1 is instructed to travel toward the traffic intersection so as to restrain entry of other vehicles into the traffic intersection. Thereby, entry of other vehicles into the traffic intersection is prevented, so that ambulance vehicle 2 can smoothly pass through the traffic intersection, as will be described later in detail. As a result, ambulance vehicle 2 can smoothly travel to its destination and arrive at the destination earlier.

Figure 3:
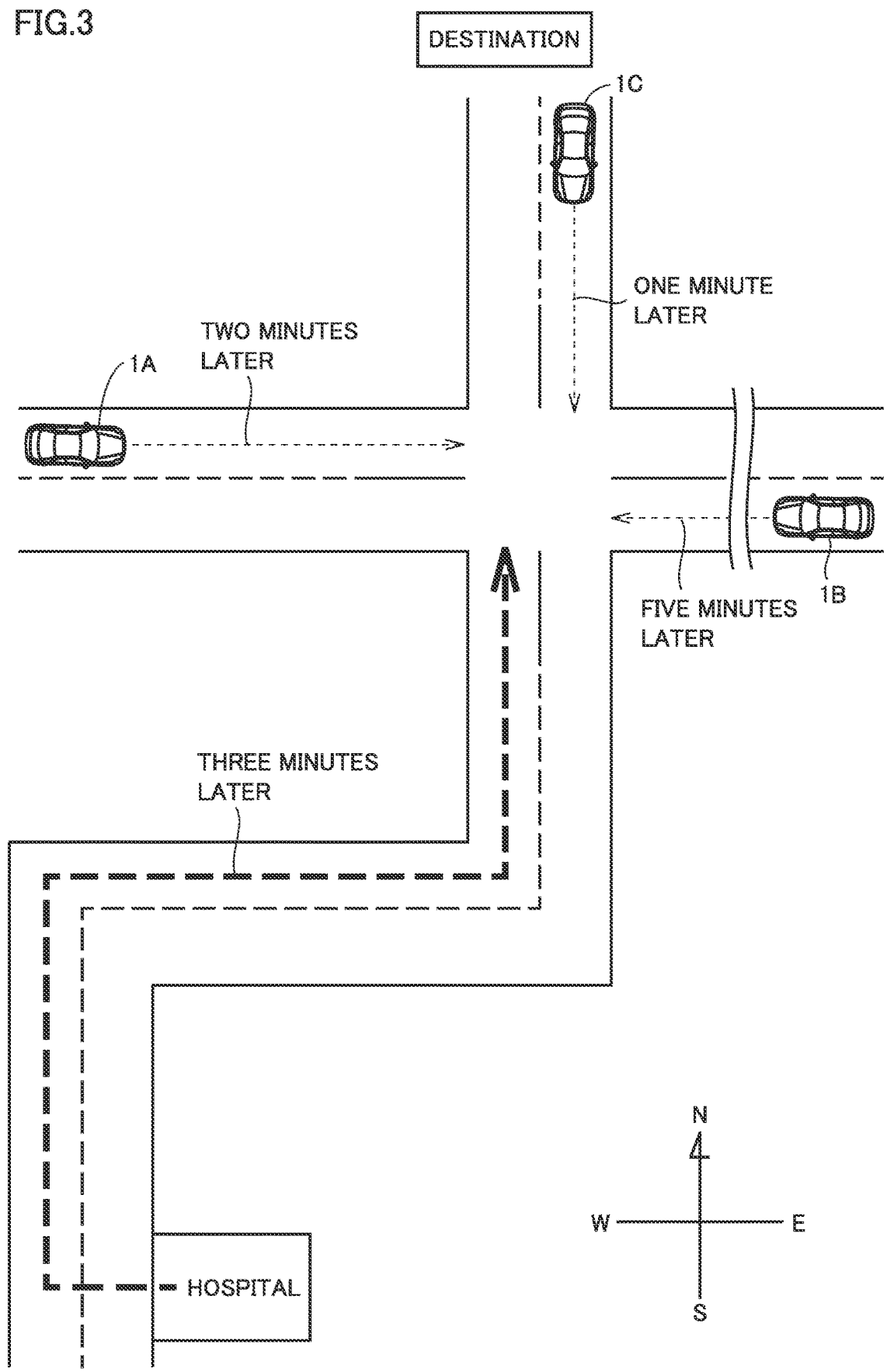
FIG. 3 is a diagram schematically showing an example of a traveling route of the emergency vehicle.
Figure 4:
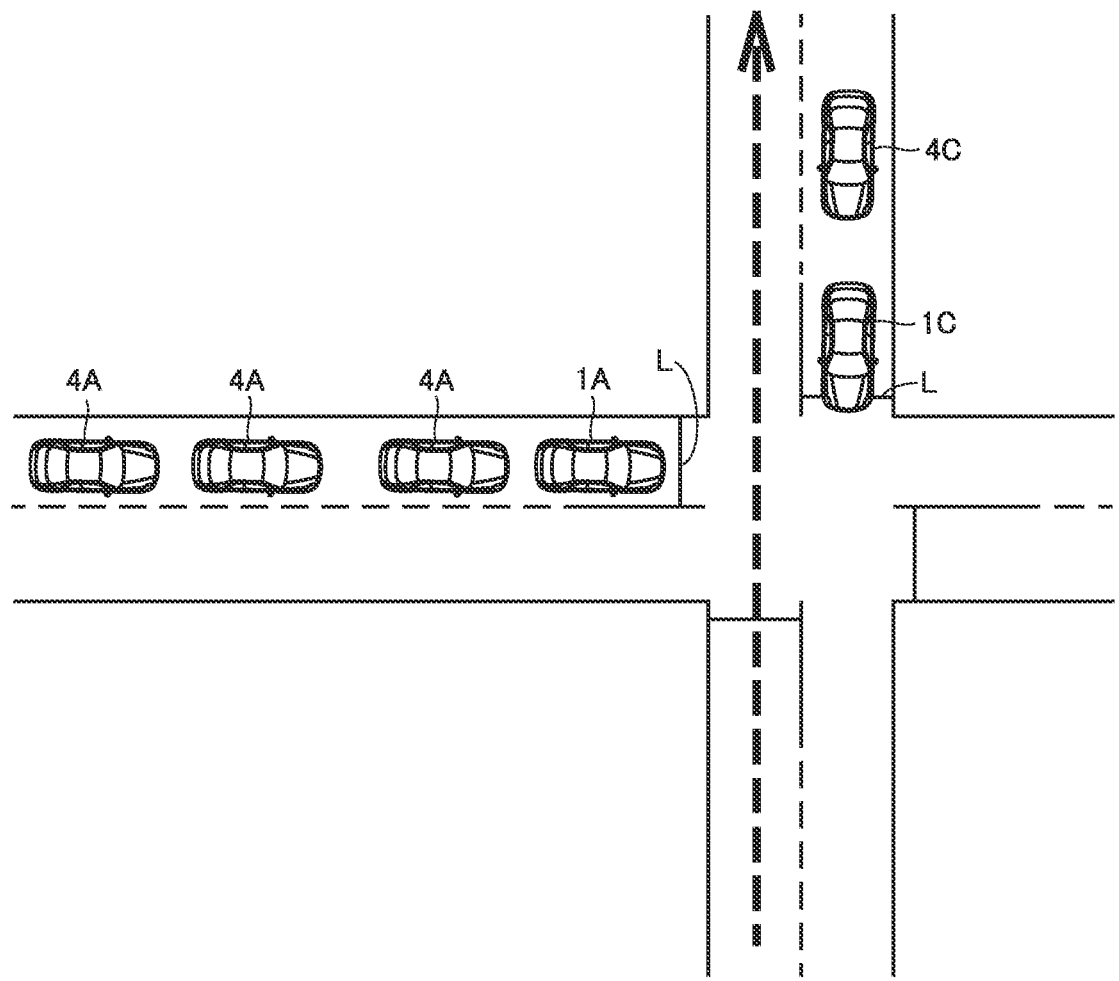
FIG. 4 is a diagram for illustrating an example of a restraining method executed at a traffic intersection by a traveling vehicle having received a restraint instruction.
Figure 6:
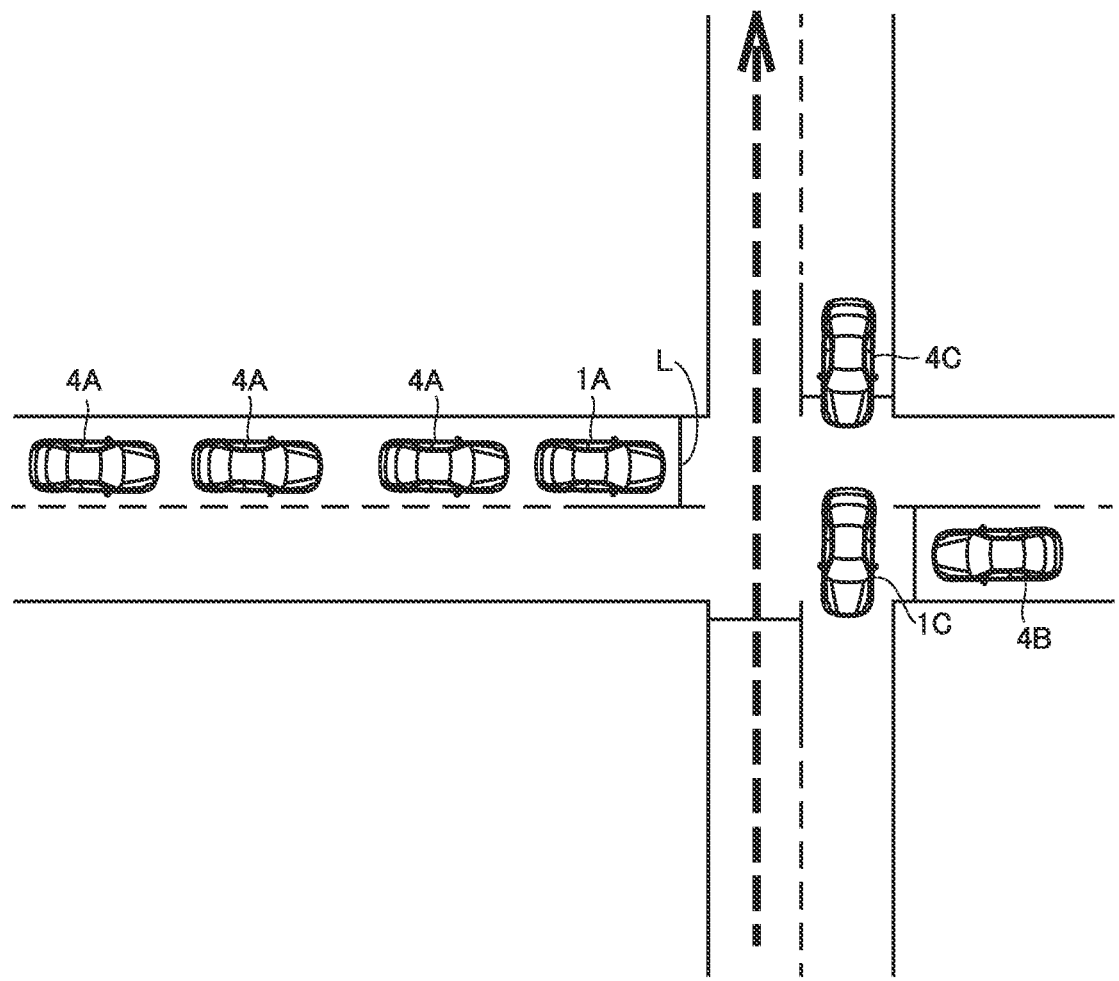
FIG. 6 is a diagram for illustrating another example of the restraint method executed at a traffic intersection by the traveling vehicle.

FIG. 3 is a diagram schematically showing an example of the traveling route of the emergency vehicle. Referring to FIG. 3 and FIGS. 4 and 6 described later in which the upper side in each of the figures is defined as the north, an explanation will be given with regard to an example of the situation where ambulance vehicle 2 travels from the southern hospital to the northern destination (where a person in need of help is located). On the expected traveling route of ambulance vehicle 2, there is a traffic intersection into which other vehicles may enter at the timing when ambulance vehicle 2 passes therethrough while executing emergency traveling. Such a traffic intersection is designated in advance in the road map data stored in map information database 312.

Referring to FIGS. 2 and 3, server 30 of communication instruction center 3 first calculates the expected traveling route of ambulance vehicle 2, and also calculates the expected arrival time at which ambulance vehicle 2 arrives at the traffic intersection on the expected traveling route of ambulance vehicle 2. In the example shown in FIG. 3, the expected arrival time of ambulance vehicle 2 is assumed to be three minutes after the current time.

Then, server 30 also acquires the expected arrival time at which each of other vehicles 1 (three vehicles 1A, 1B and 1C are shown in FIG. 3) existing in the surroundings of the expected traveling route of ambulance vehicle 2 (for example, within a prescribed distance range) arrives at the traffic intersection (the time period required for each of vehicles 1A to 1C to arrive at the traffic intersection from their respective current locations). In the example shown in FIG. 3, it is assumed that the expected arrival time of vehicle 1A is two minutes after the current time, the expected arrival time of vehicle 1B is five minutes after the current time, and the expected arrival time of vehicle 1C is one minute after the current time. Vehicles 1A to 1C may be currently traveling or may be currently in the stopped state.

In addition, the term "surroundings" of the expected traveling route of ambulance vehicle 2 means the area that is located within a prescribed range of the distance from the expected traveling route, for example. This "prescribed range" may be defined in accordance with the expected arrival time of ambulance vehicle 2, and for example, can be set to be wider as the expected arrival time is later.

In the above-described example, vehicles 1A and 1C can arrive at the traffic intersection prior to ambulance vehicle 2 while vehicle 1B can arrive at the traffic intersection only after ambulance vehicle 2 passes through the traffic intersection. Accordingly, server 30 transmits a "restraint instruction" to vehicles 1A and 1C to travel toward the traffic intersection and to restrain entry of other vehicles into the traffic intersection, but does not transmit such a restraint instruction to vehicle 1B.

FIG. 4 is a diagram for illustrating an example of the restraining method executed at a traffic intersection by vehicles 1A and 1C having received restraint instruction R1. As shown in FIG. 4, upon reception of restraint instruction R1, vehicles 1A and 1C travel toward a traffic intersection. Then, when vehicles 1A and 1C arrive at the traffic intersection, vehicles 1A and 1C stop at the position of a stop line L provided in front of the traffic intersection. Thereby, entry of following vehicles 4A and 4C into the traffic intersection is prevented. Vehicles 4A and 4C may be vehicles that are currently traveling by manned driving or may be other vehicles that are currently traveling by automated driving (or traveling around by automated driving). In addition, the vehicle having received restraint instruction R1 may be stopped in front of stop line L like vehicle 1A, but may be stopped in the state where a part of the vehicle body covers stop line L like vehicle 1C.

<Process Flow of Traveling Assisting Control>

Figure 5:
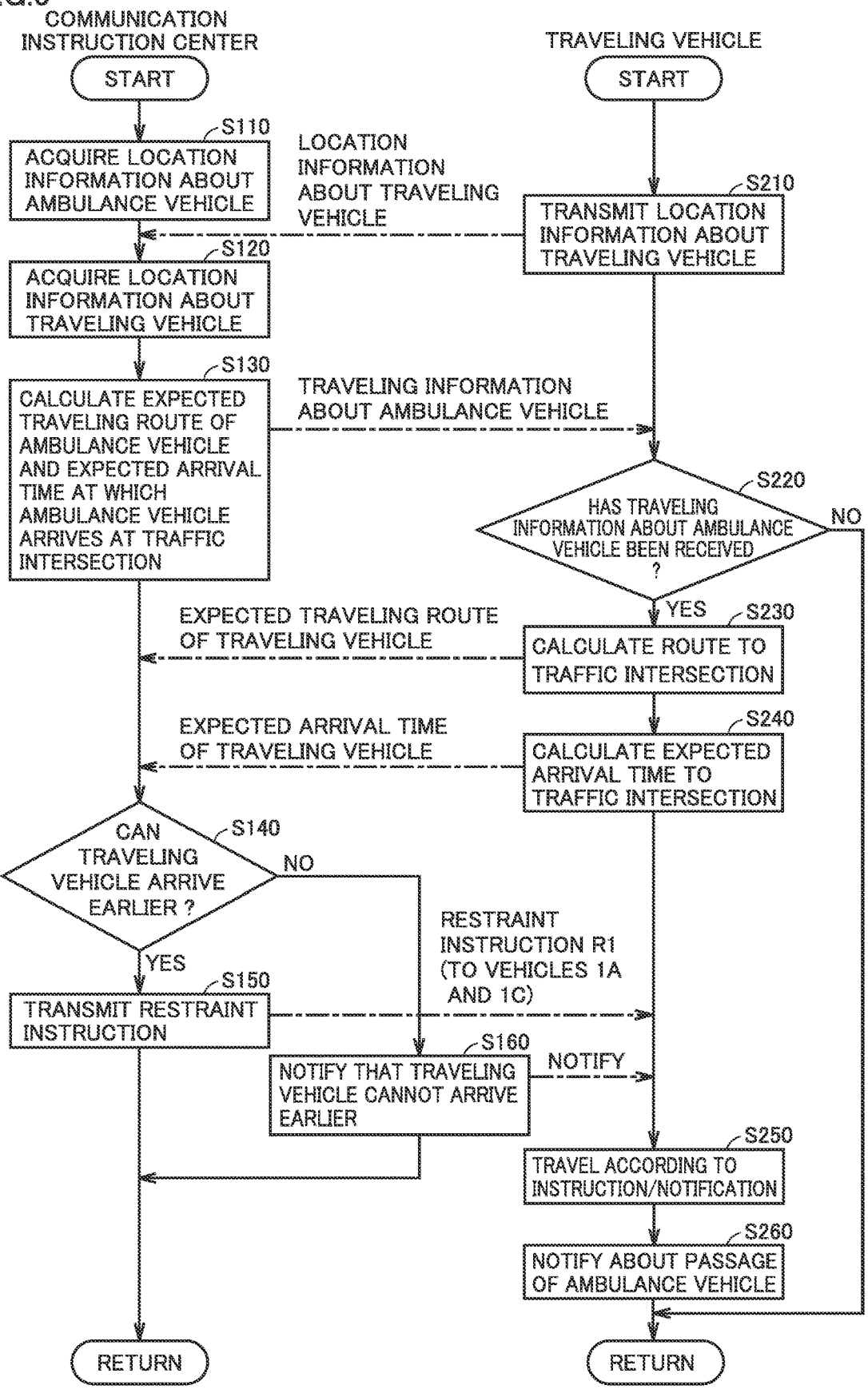
FIG. 5 is a flowchart for illustrating traveling assisting control for the emergency vehicle in the present embodiment.

FIG. 5 is a flowchart for illustrating traveling assisting control for ambulance vehicle 2 in the present embodiment. Each of steps (hereinafter abbreviated as "S") included in the flowchart shown in each of FIGS. 5 and 7 (that is described later) is basically implemented through a software process by server 30 in communication instruction center 3 or ECU 10 in vehicle 1, but may be implemented by dedicated hardware (an electric circuit) fabricated in server 30 or ECU 10.

In FIG. 5, a series of processes performed by server 30 are shown on the left side of the figure while a series of processes performed by ECU 10 are shown on the right side of the figure. The process by server 30 is performed as it is called from a main routine (not shown) each time predetermined conditions are satisfied (for example, when a request to dispatch ambulance vehicle 2 is received). The process by ECU 10 is performed, for example, as it is called from a main routine each time a predetermined time period is elapsed.

Referring to FIGS. 2 and 5, in S110, server 30 acquires the location information about ambulance vehicle 2. In the example shown in FIG. 3, ambulance vehicle 2 is currently located at a hospital. Server 30 acquires also the information about the destination to which ambulance vehicle 2 is to travel.

In S120, server 30 acquires the location information about vehicle 1. As a series of processes shown on the right side of the figure are repeatedly performed by ECU 10 in each prescribed cycle, the location information about vehicle 1 is periodically transmitted to location information database 311 and updated (see S210).

In S130, server 30 calculates the expected traveling route of ambulance vehicle 2 and the expected arrival time at which ambulance vehicle 2 arrives at each traffic intersection on the expected traveling route (see FIG. 3). This calculation can be implemented by the technique for recommended route guiding by a commonly-used navigation system (navigation device 12). On the other hand, in consideration of the fact that ambulance vehicle 2 that is executing emergency traveling can travel faster than ordinary vehicles, the coefficient for correcting the expected arrival time may be used. The calculated traveling information about ambulance vehicle 2 (the information about the expected traveling route and the expected arrival time) is transmitted to one or more vehicles 1 located in the surroundings of the expected traveling route (for example, within a prescribed distance range).

In S220, ECU 10 determines whether the traveling information about ambulance vehicle 2 has been received from server 30 or not. When the traveling information about ambulance vehicle 2 has not been received (NO in S220), the process is returned to a main routine. In this case, the location information about vehicle 1 is periodically transmitted (see S210).

When the traveling information about ambulance vehicle 2 has been received (YES in S220), ECU 10 shifts the process to S230, and calculates the expected traveling route of vehicle 1 to a traffic intersection. Furthermore, ECU 10 calculates the expected arrival time at which vehicle 1 arrives at the traffic intersection (S240). The traveling information about vehicle 1 (the expected traveling route and the expected arrival time of vehicle 1) is transmitted to server 30.

In S140, server 30 compares the expected arrival time at which ambulance vehicle 2 arrives at the traffic intersection and the expected arrival time at which vehicle 1 arrives at the traffic intersection, to determine whether the expected arrival time of vehicle 1 is earlier than the expected arrival time of ambulance vehicle 2 or not. When the expected arrival time of vehicle 1 is earlier than the expected arrival time of ambulance vehicle 2 (YES in S140), server 30 transmits restraint instruction R1 to vehicle 1 (vehicles 1A and 1C in the example shown in FIG. 3) (S150). In contrast, when the expected arrival time of vehicle 1 is later than the expected arrival time of ambulance vehicle 2 (NO in S140), server 30 notifies vehicle 1 (vehicle 1B in the example shown in FIG. 3) that vehicle 1 cannot arrive at the traffic intersection earlier than ambulance vehicle 2, and also, server 30 does not transmit restraint instruction R1 (S160).

In S250, ECU 10 causes vehicle 1 to travel according to restraint instruction R1 or the notification that vehicle 1 cannot arrive earlier, which has been received from server 30 (S250). More specifically, upon reception of restraint instruction R1, ECU 10 causes vehicle 1 to travel toward the traffic intersection to restrain entry of other vehicles into the traffic intersection, as illustrated in FIG. 4.

Furthermore, when vehicle 1 arrives at the traffic intersection, ECU 10 controls notification device 14 to notify vehicles 4 located in the surroundings of vehicle 1 that ambulance vehicle 2 is currently traveling toward the traffic intersection (S260). Specifically, ECU 10 causes a hazard lamp (not shown) to blink. Also when vehicle 1 is equipped with a display (not shown) capable of showing an indication to the outside of vehicle 1, ECU 10 may cause the display to show a message stating "emergency vehicle is expected to pass". Alternatively, ECU 10 may cause a speaker to issue an audio output stating that an emergency vehicle is expected to pass, or may cause a warning light such as a red light to turn on.

In addition, when ECU 10 receives a notification from server 30 that vehicle 1 cannot arrive at the traffic intersection prior to ambulance vehicle 2, ECU 10 causes vehicle 1 to remain in the state before ECU 10 receives the expected traveling route of ambulance vehicle 2. For example, when vehicle 1 is currently traveling toward the destination while traveling around by automated driving, vehicle 1 is kept traveling. When vehicle 1 is not traveling and in the stopped state, vehicle 1 is kept stopped.

Generally, there may be a case where a vehicle that is currently traveling around by automated driving is relatively highly flexible about the traveling route, and therefore, does not necessarily have to arrive at the destination (for example, the vehicle dispatch center) by the predetermined time. In consideration of the above-described circumstances, it is noted that, in the case of the vehicle currently traveling around by automated driving, its traveling route to the destination may be changed or its arrival time to the destination may be delayed. According to the present embodiment, before ambulance vehicle 2 arrives at the traffic intersection, vehicles 1A and 1C currently traveling around by automated driving are instructed to travel toward the traffic intersection (see FIG. 3). Then, when vehicles 1A and 1C arrive at the traffic intersection, vehicles 1A and 1C stop in the vicinity of stop line L and prevent entry of other vehicles 4A and 4C into the traffic intersection (see FIG. 4). In this way, by utilizing vehicles 1A and 1C that are currently traveling around by automated driving in the vicinity of the expected traveling route of ambulance vehicle 2, emergency traveling of ambulance vehicle 2 can be assisted, so that smooth emergency traveling of ambulance vehicle 2 can be achieved. On the other hand, since restraint instruction R1 is not transmitted to vehicle 1B unable to arrive at the traffic intersection prior to ambulance vehicle 2, needless interference with vehicle 1B that is traveling around can also be prevented.

It is also conceivable that a plurality of vehicles that can arrive at the traffic intersection prior to ambulance vehicle 2 may exist in the same direction (for example, in addition to vehicle 1A traveling from the west to the east in FIG. 4, another one vehicle traveling on the similar traveling route may exist). In such a case, as long as entry of other vehicles into the traffic intersection can be restrained by one vehicle, one of these vehicles may be prioritized over other vehicles.

Specifically, the vehicle located at the shortest distance to the traffic intersection can be prioritized. Furthermore, the vehicle under relatively low traffic restrictions (for example, the vehicle that passes through fewer traffic signals before it reaches a traffic intersection) may be prioritized. Alternatively, when entry of vehicles into the traffic intersection is restrained at an excessively early timing, it is feared that traffic congestion may occur. Accordingly, the vehicle whose expected arrival time at the traffic intersection is close to the expected arrival time of ambulance vehicle 2 (but the vehicle that can arrive at the traffic intersection prior to ambulance vehicle 2) can also be prioritized.

In the present embodiment, an explanation has been given with regard to the example in which the "obstruction site" according to the present disclosure is a traffic intersection, but the "obstruction site" is not limited to a traffic intersection. For example, the "obstruction site" may be a location where traffic congestion is more likely to occur (a junction point from a different lane or a location where truck lane restrictions are enforced due to a traffic accident or construction work).

[Modification]

In the example shown in FIG. 4, entry of following vehicle 4A, which travels from the west to the east, into the traffic intersection is prevented by vehicle 1A, and entry of vehicle 4C, which travels from the north to the south, into the traffic intersection is prevented by vehicle 1C. In this case, however, the vehicle traveling from the east to the west (not shown) may enter the traffic intersection. In the present modification, an explanation will be given with regard to the configuration in which, by using vehicle 1C, vehicles traveling from the east to the west can also be prevented from entering the traffic intersection.

FIG. 6 is a diagram for illustrating another example of a method for stopping vehicle 1C. As shown in FIG. 6, in the present modification, when vehicle 1C traveling in the direction (in the south direction) opposite to the traveling direction of ambulance vehicle 2 (in the north direction as indicated by a bold arrow) enters a traffic intersection, vehicle 1C travels beyond stop line L and reaches onto the traveling route of vehicle 4B that travels in the direction intersecting with the traveling direction of ambulance vehicle 2 (in the direction from the east to the west). Thereby, not only vehicle 4C that travels following vehicle 1C is prevented from entering the traffic intersection, but also vehicle 4B that travels in the direction intersecting with the traveling direction of vehicle 1C is also prevented from entering the traffic intersection.

Figure 7:
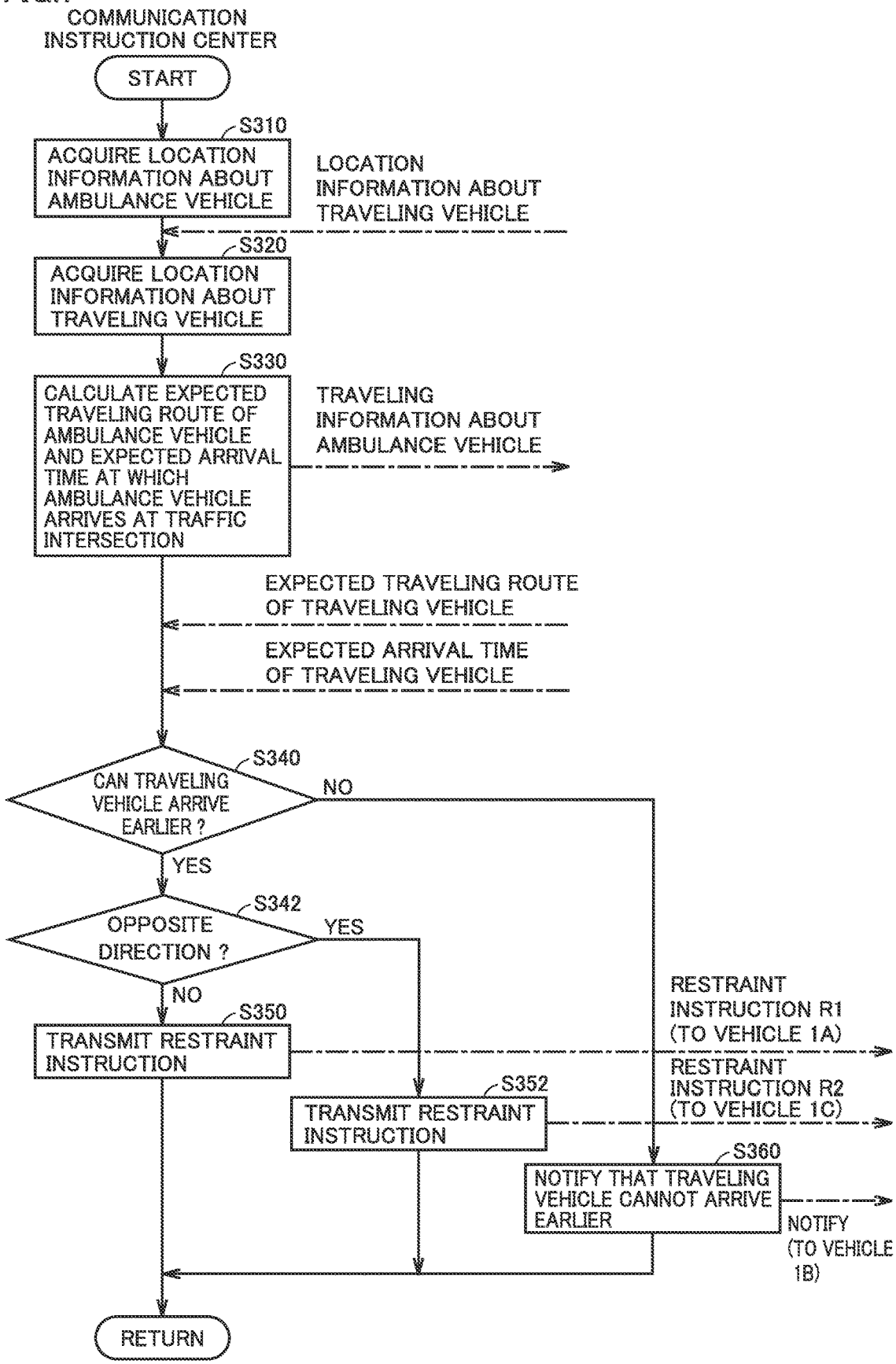
FIG. 7 is a flowchart for illustrating traveling assisting control for an emergency vehicle in a modification.

FIG. 7 is a flowchart for illustrating traveling assisting control for an emergency vehicle in a modification. It is to be noted that only a series of processes performed by server 30 of communication instruction center 3 are shown in FIG. 7 due to limitations of space. In this case, the process performed by ECU 10 of vehicle 1 is the same as the corresponding process (the process shown on the right side in FIG. 5) in the embodiment.

Referring to FIG. 7, this flowchart is different from the flowchart in the embodiment (see FIG. 5) in that it further includes processes of S342 and S352. When it is determined in S340 that vehicle 1 can arrive at a traffic intersection prior to ambulance vehicle 2 (YES in S340), server 30 determines whether the traveling direction of vehicle 1 is opposite to the traveling direction of ambulance vehicle 2. In the example shown in FIG. 3, it is determined that the traveling direction of vehicle 1C traveling in the north-south direction is opposite to the traveling direction of ambulance vehicle 2, and the traveling direction of vehicle 1A traveling in the east-west direction is not opposite to the traveling direction of ambulance vehicle 2.

When it is determined that the traveling direction of vehicle 1 is not opposite to the traveling direction of ambulance vehicle 2 (NO in S342), then in the example shown in FIG. 6, server 30 transmits restraint instruction R1 to vehicle 1A as in the first embodiment. Then, vehicle 1A having received restraint instruction R1 stops in the vicinity of stop line L in front of the traffic intersection, as shown in FIG. 6.

On the other hand, when it is determined that the traveling direction of vehicle 1 is opposite to the traveling direction of ambulance vehicle 2 (YES in S342), server 30 transmits, specifically to vehicle 1C, a restraint instruction R2 for restraining entry of other vehicles that are traveling in the direction intersecting with the traveling direction of ambulance vehicle 2. Vehicle 1C having received restraint instruction R2 travels beyond stop line L, enters the traffic intersection, and then stops on the traveling route of vehicle 4B, as shown in FIG. 6.

Since other processes in the flowchart shown in FIG. 7 are the same as the corresponding processes in the flowchart in the embodiment, detailed description thereof will not be repeated.

As described above, also in the present modification, entry of following vehicle 4A into the traffic intersection can be prevented by vehicle 1A as in the embodiment. Furthermore, vehicle 1B traveling in the direction intersecting with the traveling direction of ambulance vehicle 2 cannot arrive at the traffic intersection prior to ambulance vehicle 2. However, according to the present modification, by using vehicle 1C, vehicle 4B traveling on the traveling route of vehicle 1B can also be prevented from entering the traffic intersection. Thereby, still smoother emergency traveling of ambulance vehicle 2 can be achieved. Therefore, emergency traveling of ambulance vehicle 2 can be more strongly assisted.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A traveling assisting method for an emergency vehicle, the traveling assisting method being performed using a traveling vehicle that is currently traveling around, the traveling vehicle being configured to communicate with a server through a network, to travel by automated driving, and to travel around by unmanned driving, the traveling assisting method comprising:
   causing the server to acquire an expected arrival time at which the emergency vehicle arrives at an obstruction site where emergency traveling of the emergency vehicle is to be obstructed, the obstruction site being located on an expected traveling route of the emergency vehicle;
   causing the server to acquire an expected arrival time at which the traveling vehicle arrives at the obstruction site, when location information received from the traveling vehicle shows that the traveling vehicle is located in surroundings of the expected traveling route; and
   causing the server to transmit an instruction to the traveling vehicle to travel toward the obstruction site of the emergency vehicle and to restrain a vehicle other than the emergency vehicle from entering the obstruction site of the emergency vehicle, when the expected arrival time of the traveling vehicle is earlier than the expected arrival time of the emergency vehicle.

2. The traveling assisting method for an emergency vehicle according to claim 1, further comprising causing the traveling vehicle that arrives at the obstruction site to notify a vehicle other than the emergency vehicle that the emergency vehicle is going to travel through the obstruction site.

3. The traveling assisting method for an emergency vehicle according to claim 1, further comprising causing the server to select a traveling vehicle from among a plurality of traveling vehicles as candidates by using location information about each of the plurality of traveling vehicles, and to instruct the selected traveling vehicle to travel as the emergency vehicle.

4. The traveling assisting method for an emergency vehicle according to claim 1, wherein the obstruction site is a traffic intersection.

5. The traveling assisting method for an emergency vehicle according to claim 4, further comprising causing the server to transmit another instruction to the traveling vehicle to restrain entry into the traffic intersection of another vehicle, the another vehicle excluding the emergency vehicle and traveling through the traffic intersection in a direction intersecting with a traveling direction of the emergency vehicle, when the expected arrival time of the traveling vehicle is earlier than the expected arrival time of the emergency vehicle, and when a traveling direction of the traveling vehicle at the traffic intersection is opposite to the traveling direction of the emergency vehicle.

6. A traveling assisting system for an emergency vehicle, the traveling assisting system comprising:
    a server including a map information database storing information about an obstruction site, the obstruction site being located on an expected traveling route of the emergency vehicle and where emergency traveling of the emergency vehicle is to be obstructed; and
    a traveling vehicle configured to communicate with the server through a network, to travel by automated driving and to travel around by unmanned driving,
    the server being configured to
        acquire an expected arrival time at which the emergency vehicle arrives at the obstruction site,
        acquire an expected arrival time at which the traveling vehicle arrives at the obstruction site, when location information received from the traveling vehicle shows that the traveling vehicle is located in surroundings of the expected traveling route, and
        transmit an instruction to the traveling vehicle to travel toward the obstruction site of the emergency vehicle and to restrain a vehicle other than the emergency vehicle from entering the obstruction site of the emergency vehicle, when the expected arrival time of the traveling vehicle is earlier than the expected arrival time of the emergency vehicle.

* * * * *